Patented Aug. 4, 1925.

1,548,293

UNITED STATES PATENT OFFICE.

STANLEY D. WILKINS, OF ST. LOUIS, MISSOURI, ASSIGNOR OF ONE-THIRD TO HARRY C. REINER AND ONE-THIRD TO EDWARD C. GOULD, BOTH OF ST. LOUIS, MISSOURI.

MOLASSES PRODUCT AND PROCESS OR METHOD OF PRODUCING THE SAME.

No Drawing.   Application filed May 10, 1924.   Serial No. 712,448.

*To all whom it may concern:*

Be it known that I, STANLEY D. WILKINS, a citizen of the United States, residing at the city of St. Louis, State of Missouri, have invented a certain new and useful Molasses Product and Process or Method of Producing the Same, of which the following is a specification.

This invention relates to a certain new and useful molasses-product and to the process or method of producing the same.

A residue from the manufacture of white or cane sugar is commonly known and designated blackstrap molasses. This residue contains the mineral salts, together with certain organic elements, such as gums, of the cane juice, and due to its composition, this residue is today, as is well known, a valuable constituent of many manufactured products, such, for instance, I may here mention, as stock-foods, chewing tobacco, orchard-sprays, and numerous others.

The residue blackstrap molasses, however, at ordinary temperatures, is highly viscous in its nature or character, containing at times fully one-third by volume of included and dissolved gases, and its high viscosity necessitates the employment of special machinery or means for effecting a more or less ready flow in the manufacturing plants. Furthermore, blackstrap molasses, because of its high moisture or water content, averaging from twenty-four to twenty-eight per cent, is subject to fermentations, and use thereof at points distant from its source of production is costly in carrying and freight charges, all of which necessarily increases the cost of production, with a correspondingly increased cost to the consuming public, of the various products into which it enters. And while blackstrap molasses is of great commercial value in numerous industries, its extensive use is limited because of its liquid form and because it is variable in quality, is not easily handled, and requires special storage facilities and usually special manipulating machinery in commercial manufacturing plants.

I have discovered, however, that the present inherent defects in liquid blackstrap molasses which militate against its wide and extensive use may be overcome by a process of dehyration, and as the result of my discovery and experiments in carrying the same into use and practice, I have developed and produced a dehydrated molasses which may not only be economically substituted for liquid blackstrap molasses in substantially all its present uses, but which may also be advantageously and profitably applied and put to many uses to which liquid blackstrap molasses is inapplicable or impracticable on account of its fluid nature and character.

In developing my discovery and in carrying the same into practice, I employ a suitable dehydrating apparatus, and for illustrations of such apparatus that may be employed in the production of my new product, I might here specifically refer to the apparatus shown and described in United States Letters Patent Nos. 1,298,470 of November 25, 1919, and 1,374,455 of April 12th, 1921. I have found, however, that it is essential in the production of my new product to first lower the viscosity of the molasses to facilitate its handling in the dehydrating apparatus, and, to that end, the liquid molasses is first heated with live steam to a temperature that will not injuriously affect the constituents of the molasses; such temperature, I have found to obtain the best results, should be approximately 190° Fahrenheit.

The liquid molasses so heated is then run through the dehydrating apparatus, the resulting product having the character of a relatively fine powder containing less than one percent of water as determined in a suitable vacuum oven, and I may add that the time actually consumed from the moment a unit volume of liquid molasses is first put into the centrifugal atomizer of the dehydrating apparatus until it is dehydrated and ready to be sacked or otherwise packed is a matter of only a few seconds' time.

Such resulting pure dehydrated molasses in powder form embodies and contains all the solids and beneficial ingredients of liquid molasses, and because of the presence of gums and mineral substances in its composition is hygroscopic in disposition. Such condition, I may say, however, is not an obstacle to the wide and extensive commercial use of the product, for, when the powder is packed direct from the dehydrating apparatus into heavy paper bags or other suitable containers, such as are used in flour-mills or by stock-feed manufacturers, the product will remain sufficiently dry for ready and convenient handling. Yet, that my new resulting dehydrated molasses may be substantially non-hygroscopic, I first, prior to dehydration and at time of heating, as before mentioned, incorporate into the liquid molasses a so-called stabilizer in the nature preferably of a suitable colloid. The resulting product is a non-hygroscopic fluffy powder lighter in color than the pure or untreated product, the appearance of the final product being determined largely by the character of the colloid used. As a suitable colloid, I may mention that I have heretofore employed casein or skimmed milk solids in the proportions approximately of one part of skimmed milk solids to two parts of liquid molasses, the resulting product, as I have stated, having the character and nature of a fluffy powder, uniform in quality, and possessing as its constituents substantially all the beneficial or valuable ingredients of liquid blackstrap molasses. I may add that the final composition of the product of straight blackstrap molasses is substantially the following, namely, water, one-half to one percent; ash, eight to nine and three-tenths percent; protein, two and six-tenths to four percent; sugar, seventy-three to seventy-seven percent; and gums, nine and three-tenths to thirteen percent, the casein or colloid substances necessarily in the non-hygroscopic product changing it from a carbohydrate or fattening food to a richer protein food.

As so produced and manufactured, my new dehydrated non-hygroscopic molasses may be most readily, conveniently, and economically handled and may not only be applied to substantially all of the present day uses of liquid molasses, but its use also extended into many industries in which today use of liquid blackstrap molasses is impractical. The cost of production of my new product is nominal and its cost of handling cheap, and consequently the cost of production of the various products into which it enters may be correspondingly reduced with a resulting reduction in price to the consuming public.

Having thus described my invention, what I claim and desire to secure by Letters Patent is:

1. A composition of matter consisting of an intimate mixture of the dehydrated components of a major percentage of blackstrap molasses with a minor percentage of a stabilizer, the composition being non-hygroscopic and having the character of a dry powder.

2. A composition of matter consisting of an intimate mixture of the dehydrated components of a major percentage of blackstrap molasses with a minor percentage of casein, the composition being non-hygroscopic and having the character of a dry powder.

3. The process of producing a new composition of matter having the form of a non-hygroscopic dry powder and comprising an intimate mixture of dehydrated components of a major percentage of blackstrap molasses with a minor percentage of a stabilizer, which consists in first treating liquid molasses with live steam to reduce its normal viscosity, incorporating in the liquid molasses at time of treating a lesser percentage of the stabilizer, and then passing the treated liquid molasses and stabilizer through a dehydrating apparatus.

4. The process of producing a new composition of matter having the form of a non-hygroscopic dry powder and comprising an intimate mixture of dehydrated components of a major percentage of blackstrap molasses with a minor percentage of casein, which consists in first treating liquid molasses with live steam to reduce its normal viscosity, incorporating in the liquid molasses at time of treating a lesser percentage of the casein, and then passing the treated liquid molasses and casein through a dehydrating apparatus.

In testimony whereof, I have signed my name to this specification.

STANLEY D. WILKINS.